United States Patent [19]
Gruber

[11] Patent Number: 5,816,430
[45] Date of Patent: Oct. 6, 1998

[54] FUEL TANK VENT VALVE FOR HEATERS

[75] Inventor: Thomas J. Gruber, Gates Mills, Ohio

[73] Assignee: Hunter Manufacturing Co., Solon, Ohio

[21] Appl. No.: 865,081

[22] Filed: May 29, 1997

[51] Int. Cl.⁶ .................................................. B65D 51/00
[52] U.S. Cl. ................................. 220/367.1; 220/203.02; 220/DIG. 33
[58] Field of Search ................................ 220/367.1, 373, 220/203.01, 203.02, 203.03, 203.11, 203.18, DIG. 32, DIG. 33

[56] References Cited

U.S. PATENT DOCUMENTS

| | | |
|---|---|---|
| 1,017,756 | 2/1912 | Head . |
| 2,333,310 | 11/1943 | Greening . |
| 2,646,059 | 7/1953 | Wittner et al. . |
| 3,191,622 | 6/1965 | Finlayson . |
| 3,412,747 | 11/1968 | Sichler . |
| 3,974,936 | 8/1976 | Gerdes ............................... 220/203.02 |
| 4,134,535 | 1/1979 | Barthels et al. ............... 220/203.03 X |
| 4,440,193 | 4/1984 | Matheson . |
| 4,440,308 | 4/1984 | Baker .................................. 220/203.02 |
| 4,708,171 | 11/1987 | Cudaback . |
| 4,711,224 | 12/1987 | Eckhardt . |
| 4,805,661 | 2/1989 | Knapp et al. . |
| 4,854,486 | 8/1989 | Daley et al. . |
| 4,867,740 | 9/1989 | East . |
| 4,893,651 | 1/1990 | Herman et al. . |
| 4,913,303 | 4/1990 | Harris ........................ 220/DIG. 33 X |
| 4,921,071 | 5/1990 | Lonnborg et al. . |
| 5,284,261 | 2/1994 | Zambuto . |
| 5,419,366 | 5/1995 | Johnston . |

*Primary Examiner*—Steven M. Pollard
*Attorney, Agent, or Firm*—Fay, Sharpe, Beall, Fagan, Minnich & McKee

[57] ABSTRACT

A jerrycan holds liquid fuel. A cap for the jerrycan includes an air vent valve assembly having an umbrella-shaped check valve. The check valve is sensitive to a pressure differential between an interior of the jerrycan and the atmosphere. As fuel is dispensed from the jerrycan, a volume of an air chamber within the jerrycan increases, thereby decreasing the pressure in the jerrycan and creating a vacuum. The vacuum causes the rate at which fuel is dispensed from the jerrycan to decrease. The check valve dislodges when the pressure within the jerrycan becomes less than the pressure of the atmosphere and additional air is introduced into the jerrycan. The air fills the expanded volume of the air chamber, thereby increasing the pressure, eliminating the vacuum and causing the rate at which fuel is dispensed to increase.

20 Claims, 10 Drawing Sheets

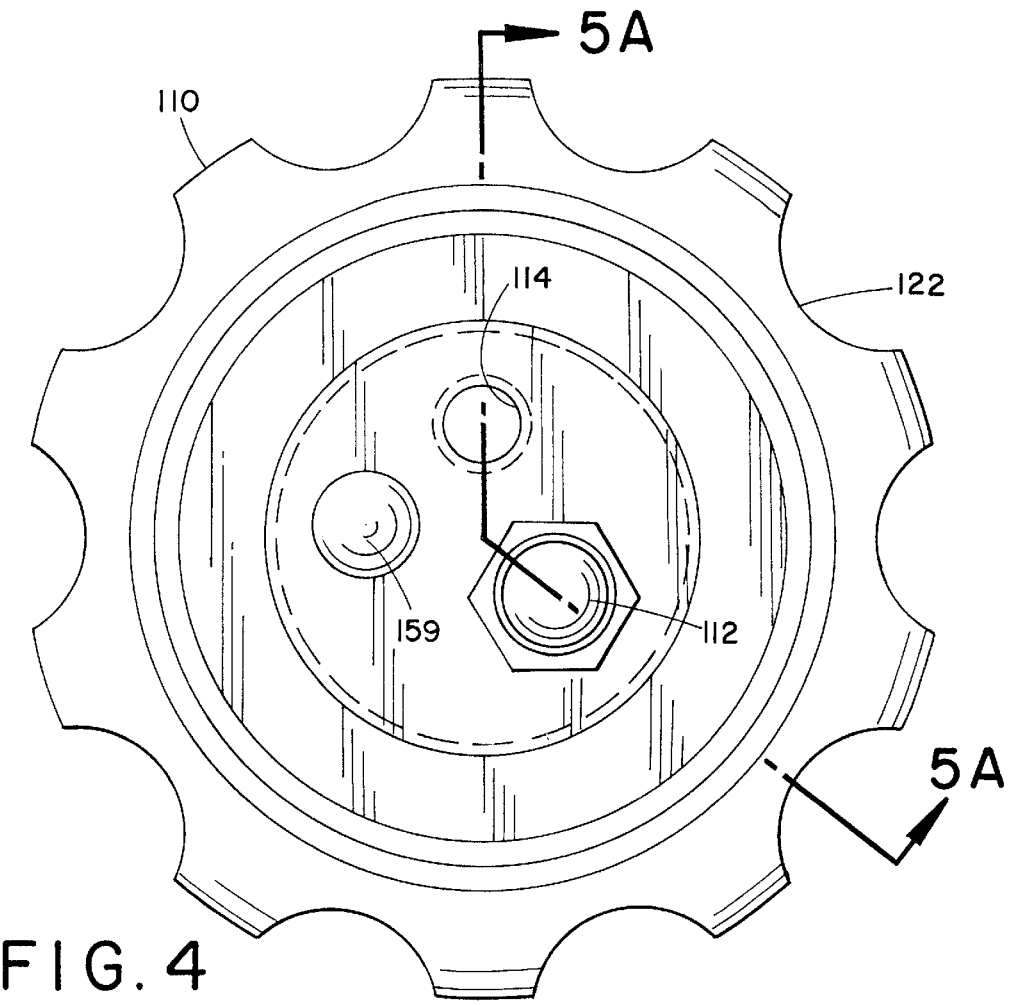
FIG. 4
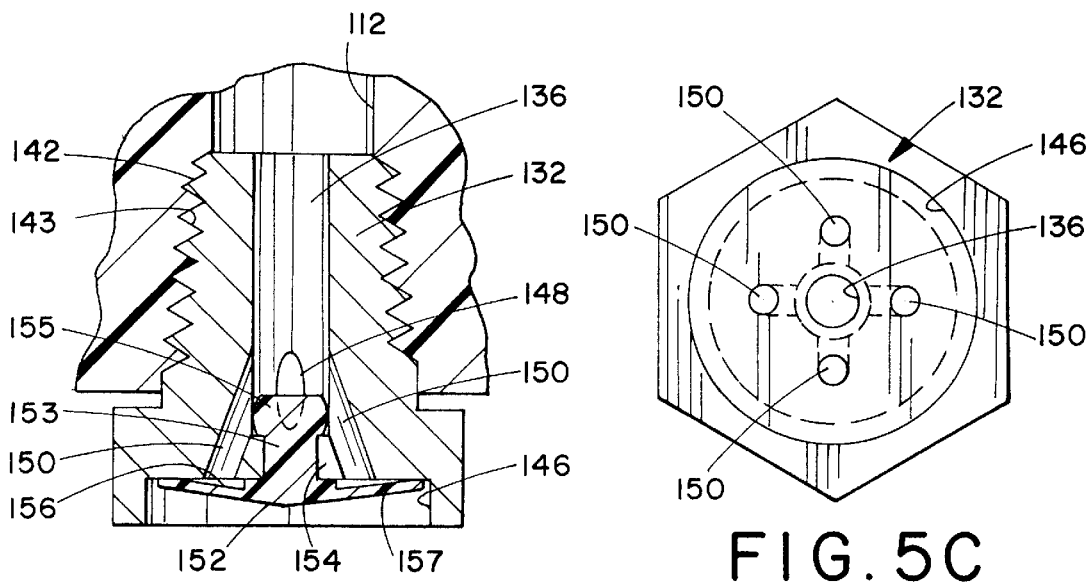
FIG. 5B
FIG. 5C

FUEL TANK VENT VALVE FOR HEATERS

BACKGROUND OF THE INVENTION

The present invention relates to vent valves for liquid delivery systems. It finds particular application in conjunction with fuel tanks used in heaters or stoves for military or camping applications and will be described with particular reference thereto. It will be appreciated, however, that the present invention may find other utility as well.

Fuel fired heaters or stoves typically receive fuel from a jerrycan, often having a 5-gallon capacity. During use, the jerrycan is typically connected to a fuel hose and tipped upside-down so that fuel is permitted to run out of the can, under the force of gravity, and through the fuel hose to the burner. As fuel leaves the can, however, the level of fuel in the can is lowered and the volume of an air chamber defined at an upper end of the jerrycan is increased. If enough air is not introduced into the can to equalize pressure in the air chamber, a vacuum is created. Such vacuum slows down and eventually stops the flow of fuel from the can. Therefore, in order to provide for the uninterrupted flow of fuel from the inverted jerrycan, it is necessary to include an air inlet means to allow air flow into the jerrycan as fuel flows out.

Heretofore, fuel tank vent adapter kits employed an elongated tube inserted into the tank. The tube extended in the tank from an air inlet located in the cap of the tank, such as a jerrycan. When the tank was inverted, the tube extended from the bottom of the tank to an opposed top corner of the tank, thereby ensuring that the tube extended into the air chamber. It was necessary to open a petcock valve attached to the air inlet before air was allowed to flow through the tube. This required the operator of the heater to remember to open the valve to allow air to flow into the tank at the appropriate time. However, when the valve was opened there was invariably fuel inside the tubing and this flowed out, falling to the ground, and contaminating same, and possibly on the shoes or clothing of the operator.

The present invention provides a new and improved apparatus and method which overcomes the above-referenced problems and others and provides better and more advantageous results.

SUMMARY OF THE INVENTION

A tank vent valve assembly comprises a tank, a cap mounted on the tank, an outlet passage through the cap and an inlet passage through the cap. The inlet passage has a first end and a second end. A first housing is mounted in the first end of the inlet passage of the cap. The first housing has a first end and a second end. A second housing is mounted in the second end of the inlet passage of the cap. The second housing has a first end and a second end. A first air passage extends through the first housing and has a first end and a second end. The first end of the first air passage communicates with an exterior of the first end of the first housing and the second end of the first air passage communicates with an exterior of the second end of the first housing. A second air passage extends in the second housing and has a first end and a second end. The first end of the second air passage communicates with an exterior of the first end of the second housing and the second end of the second air passage communicates with an exterior of the second end of the second housing. The first end of the first air passage communicates with the first end of the second air passage. A check valve is mounted in the second housing. The check valve comprises an elastomeric material and has a first face and a second face. The first face seals against the second end of the second air passage when a pressure on the first face is not greater than a pressure on the second face. The first face does not seal against the second end of the second air passage when the pressure on the first face is greater than the pressure on the second face so that the exterior of the second end of the first housing is in communication with the second end of the second housing.

In accordance with one aspect of the invention, additional openings are located near the second end of the second air passage.

In accordance with a more limited aspect of the invention, the additional openings communicate with the second end of the second housing when the check valve does not seal the second end of the second air passage.

In accordance with another aspect of the invention, the second end of the second air passage contains a sintered metal.

In accordance with yet another aspect of the invention, the second housing comprises indents sized for gripping.

One advantage of the present invention is the provision of a vent valve assembly in which fuel does not escape from a fuel tank when the valve is opened.

Another advantage of the present invention is the provision of a fuel tank cap having grips which facilitate the installation and removal of the cap from the tank.

Another advantage of the present invention is the provision of four side openings and four side air passageways for providing air to the jerrycan when the check valve dislodges and does not seal the second end of the second air passage.

Another advantage of the present invention is the provision of sintered metal blocks through which air passes freely when the check valve dislodges and does not seal the second end of the second air passage.

Another advantage of the present invention is the provision of a plastic vent fitting at the second end of the second air passageway for allowing air to flow freely through spaced bores when the check valve dislodges and does not seal the second end of the second air passage.

Still further advantage s of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments of the invention and are not to be construed as limiting the invention.

FIG. 4 is a bottom plan view of a two-piece cap according to a first embodiment of the present invention;

FIG. 5B is an enlarged cross-sectional view of a vent valve assembly of the cap of FIG. 5A;

FIG. 5C is a bottom plan view of a vent fitting of the vent valve assembly of FIG. 5B;

DETAILED DESCRIPTION OF THE PREFERRED EMBODIMENTS

Figure 1:
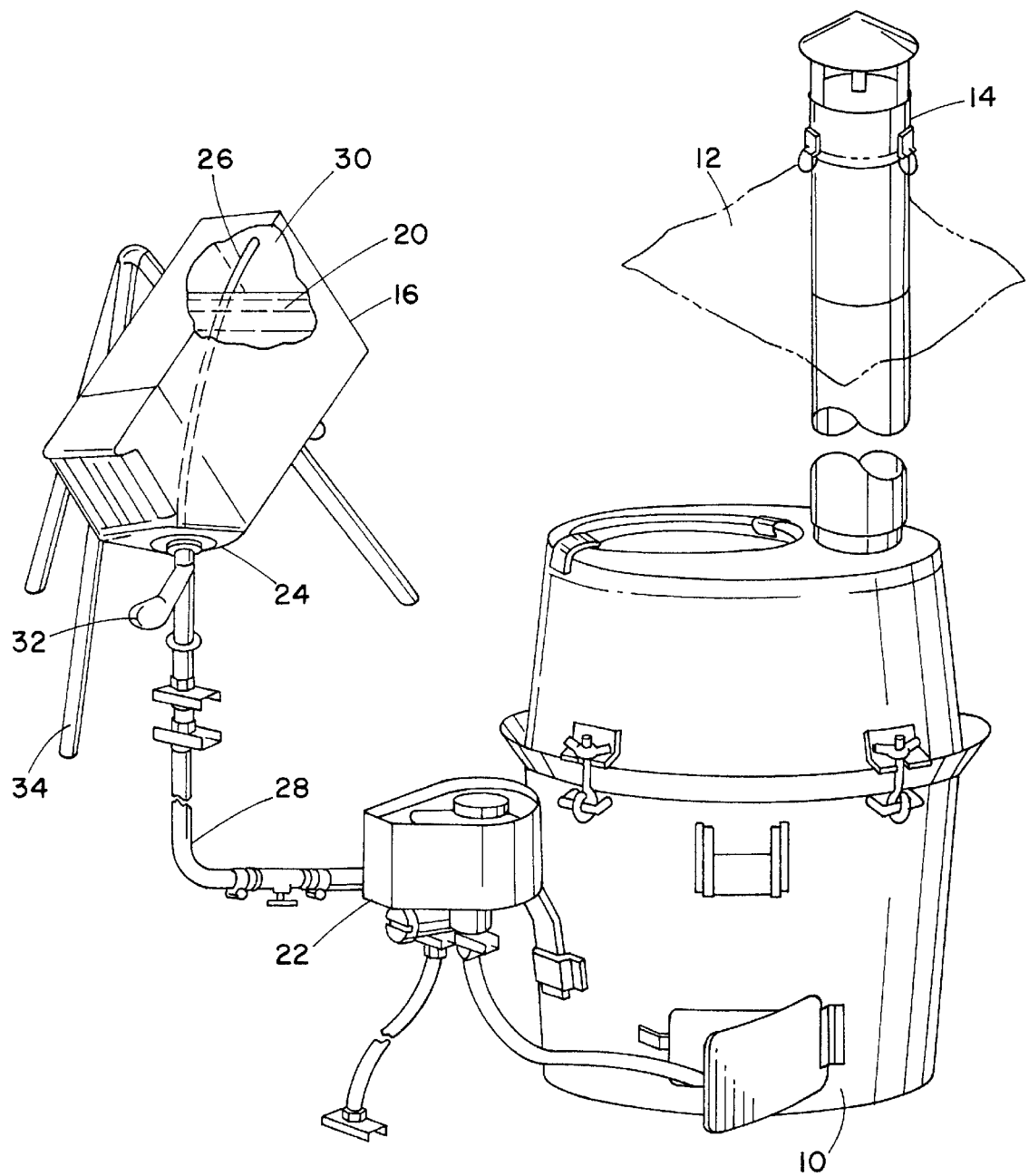
FIG. 1 is a perspective view of a jerrycan connected to a space heater, wherein a prior art cap is used on the jerrycan.

With reference to FIG. 1, a heater 10 is shown located inside a tent 12. An exhaust 14 vents fumes from the heater 10 to the environment. A fuel tank in the form of a jerrycan 16 feeds fuel 20 to the heater 10. A regulator 22 controls flow of the fuel 20 through a hose 23 to the heater 10. Once the jerrycan 16 is filled with fuel 20, a conventional cap 24 is attached to an opening of the jerrycan. Secured to the cap 24 is an air inlet hose 26.

The can 16 is then inverted so the cap 24 faces downward and the air inlet hose 26 extends to an air chamber 30 located at an upper-most corner of the can 16. A petcock 32 controls the flow of air to the air inlet hose 26. The can is then placed in a stand 34. The fuel line 23 is then attached to the cap 24. As mentioned, the fuel line 23 conveys the fuel 20 from the jerrycan 16 to the regulator 22, and then to a burner of the heater 10.

Once the can 16 is inverted and secured in the stand, the petcock 32 is opened to allow air to flow into the air inlet hose 26. Since the end of the air inlet hose 26 is above the level of the fuel 20 in the jerrycan 16 in the inverted position, no fuel escapes through the hose 26. However, a small amount of fuel 20 will flow into the air inlet hose initially when the jerrycan is still in the upright position. This fuel will flow through the hose 26 when the can 16 is later inverted. Such fuel will drip onto the shoes or clothing of the operator if he is not careful. If the operator is careful, the fuel will drip onto the ground, which is also undesirable. When the petcock 32 is opened, air flows freely into the air chamber of the jerrycan 16 so that a vacuum does not form as fuel 20 leaves the can 16 through the cap 24.

Figure 2:
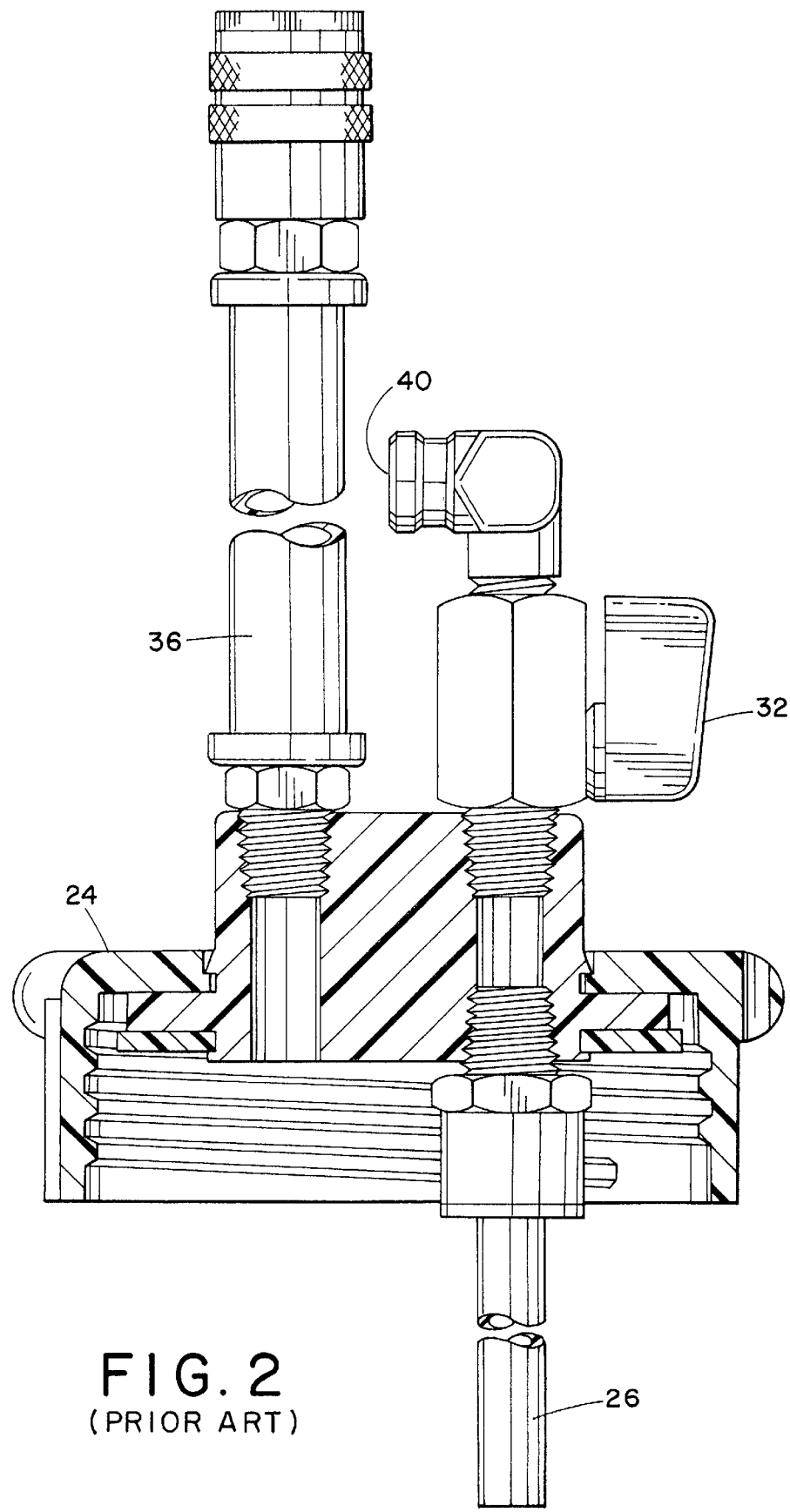
FIG. 2 is a n enlarged cross-sectional view of the prior art cap of FIG. 1.

FIG. 2 is a cross-sectional view of the conventional cap 24. The petcock 32 shown in FIG. 2 is in the form of a known flap valve. The flap valve is opened by orienting it parallel to the inlet hose 26 and closed by orienting it perpendicular to the air inlet hose.

Once the flap valve is opened, air enters the inlet hose 26 through an air inlet 40 and fuel will drip down from the air inlet.

Figure 3:
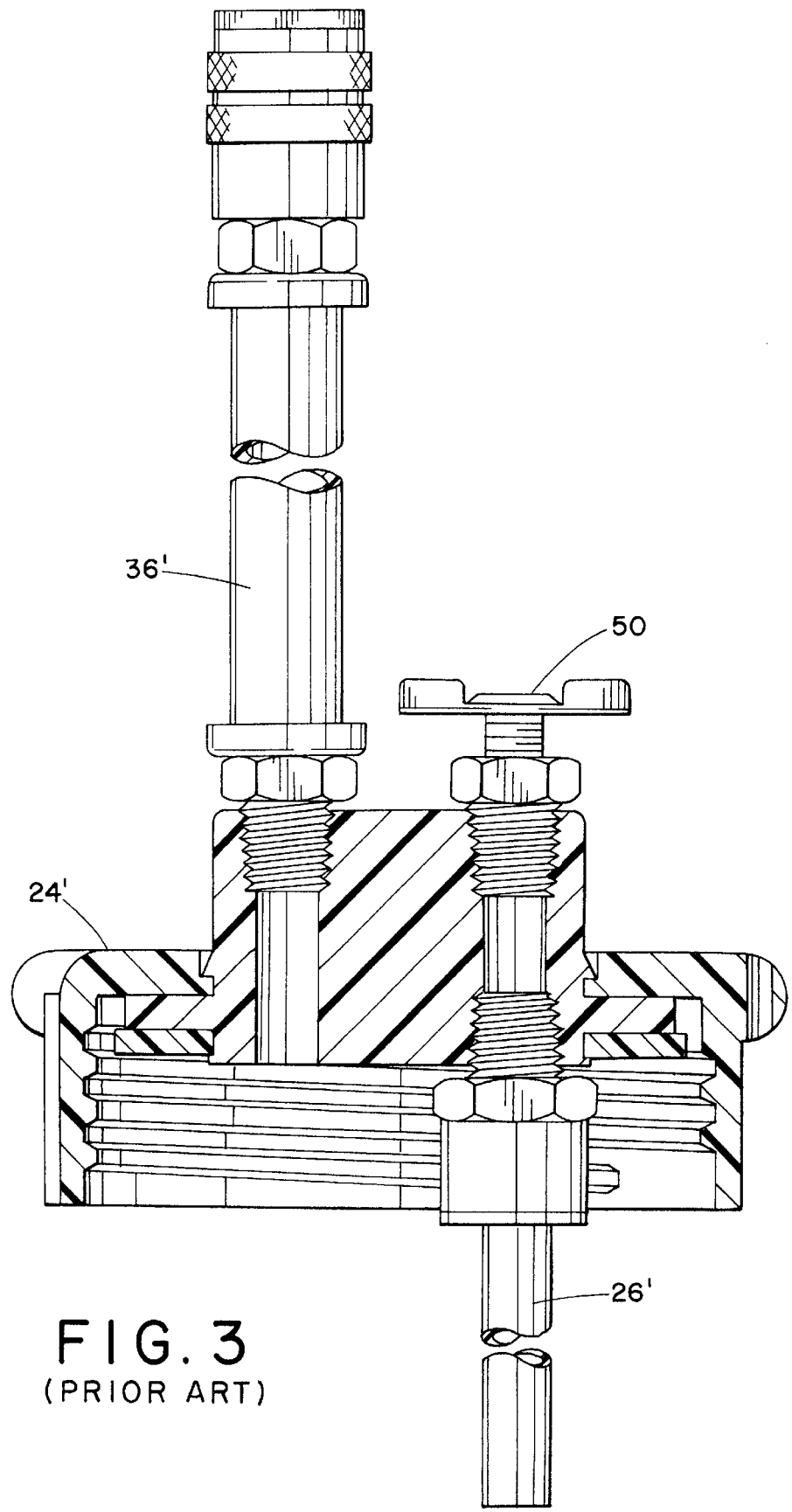
FIG. 3 is a cross-sectional view of another prior art cap.

FIG. 3 is a cross-sectional view of another conventional cap. For ease of understanding this embodiment of the present invention, like components are designated by like numerals with a primed (') suffix and new components are designated by new numerals. The cap 24' has a petcock in the form of a screw valve 50. The screw valve is opened by loosening it. When the screw valve is open, air enters the air inlet hose 26' to vent the jerrycan. As with the valve of FIG. 2, a small amount of fuel is retained in the inlet hose 24' when can 16 is tipped. This fuel will drip down from the valve 50 after the valve is opened.

With reference to FIG. 4, a bottom plan view of a cap 110 according to a first preferred embodiment of the present invention is shown. The cap 110 includes through passages 112, 114 to a vent assembly 116 (see FIG. SA) and a fuel outlet hose 120 (see FIG. 5A), respectively. The outer perimeter of the cap 110 includes indents 122 sized for manual engagement. The indents 122 allow for an easier installation and removal of the cap 110 from the jerrycan than do the prior art caps illustrated in FIGS. 2 and 3.

Figure 5A:
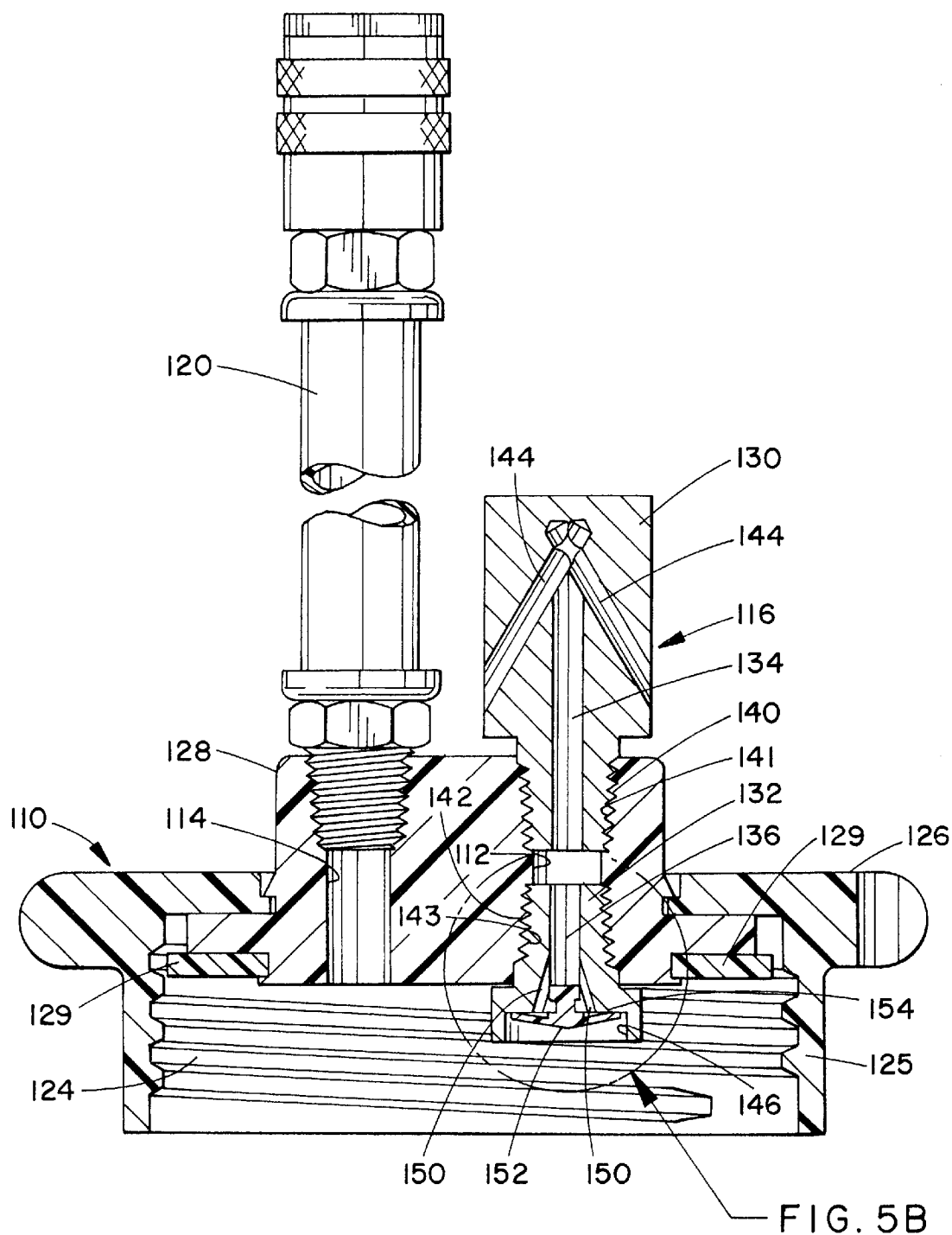
FIG. 5A is a cross-sectional view of the cap of FIG. 4, along lines 5A—5A.

The cap 110 of FIG. 5A is a two-piece assembly comprising a rim piece 126 which surrounds an insert 128. A groove of the insert 128 cooperates with a flange of the rim 126 thereby securing the two pieces. The insert 128 contains the passages 112, 114 which communicate the vent assembly 116 and the fuel outlet hose 120 with the interior of the can. The insert 128 can rotate in relation to the rim 126. An air-tight seal between the cap and the can is provided by a conventional seal member 129 which is secured in a groove in the insert. The rim and the insert 126, 128 preferably comprise a fuel resistant thermo-plastic material, although other materials are also contemplated.

As seen in FIG. 5A, the rim piece 126 of cap 110 includes a threaded inner surface 124 located on a skirt 125 for engaging mating threads on the jerrycan. The cap 110 forms an air-tight seal when fastened onto the can.

The vent assembly 116 comprises a first housing 130 and a second housing 132 fastened in respective ends of the bore 112. The first housing 130 includes a first air passageway 134 coaxial with the bore 112. The second housing 132 includes a second air passageway 136 also coaxial with the bore 112.

The first housing 130 has a threaded outer peripheral section 140 for engaging with a first threaded section 141 of the passage 112 of the insert 128. A first end of the first air passageway 134 communicates with the passage 112. A second end of the first air passageway 134 communicates with the atmosphere through air inlets 144. The air inlets 144 are preferably angled in a direction toward the cap 110 to prevent water from entering the jerrycan when the can, and the cap, are in an upright condition.

The second housing 132 also has a threaded outer peripheral section 142 which engages a second threaded section 143 of the passage 112. A first end of the second air passageway 136 communicates with the passage 112 and with the second end of the first air passageway 134. With reference now to FIG. 5B, a second end of the second air passageway 136 terminates in a recessed section 146 and communicates with an interior of the jerrycan. Side openings 148, located near the second end of the second air passageway 136, communicate with the recessed section 146 through four side air passages 150 (FIG. 5C).

An umbrella-shaped check valve 152 abuts against the recessed section 146 of the second housing 132. A stem 153 of the check valve 152 is located in the passage 136. A distal end 154 of the passage 136 is smaller in diameter than a tip 155 of the check valve 152. An enlarged tip 155 of the check valve 152 secures the check vale in the second housing 132. The stem 153 effectively seals the end of the passage 136 thereby forcing air flow instead through the side air passages 150. A perimeter of an inner face 156 of the check valve 152 seals against a surface 157 of the recessed section 146 to prevent flow through the passages 150.

The check valve 152 is preferably made from a resilient thermoplastic which is fuel resistant. One known such material is a VL1401M271 fluorosilicone material sold by Vernay Laboratories of Yellow Springs, Ohio.

The perimeter of the valve 152 is sensitive to a pressure differential between the inside and outside of the jerrycan. More specifically, the perimeter of the valve 152 seals the side air passages 150 when a pressure inside the jerrycan is greater than or equal to a pressure outside the can. The seal is broken if the pressure inside the can falls below the pressure outside the can. When the seal is broken, the valve inner face 156 separates from the surface 157 and air flows from the atmosphere, through the first and second air passageways 134, 136, through the side air passages 150 and to the interior of the jerrycan. Once inside the can, the air bubbles through the fuel to the air chamber located at the top of the jerrycan.

With reference again to FIG. 5A, the fuel outlet hose 120 connects to the fuel outlet passage 114. During operation of the heater, fuel is dispensed from the can through outlet passage 114 to the fuel outlet hose 120. As the fuel leaves the can, the volume of the air chamber within the can increases. If sufficient air is not introduced into the jerrycan, a vacuum is created within the can. The vacuum reduces the pressure within the can and slows down and eventually stops the fuel from leaving the can. When a vacuum causes the pressure within the can to drop below the atmospheric pressure, the perimeter of the check valve 152 is dislodged by air pressure exerted through the passages 134, 112, 136, 150, breaking the seal of the valve inner face 156 against the surface 157. When the seal is broken, air is permitted to enter the jerrycan to equalize the pressure, thereby eliminating the partial vacuum. Once the pressure is equalized, the perimeter of the check valve 152 again seals against the surface 157 due to the resilient nature of the material from which the check valve is made. Over time, the check valve 152 may become dislodged or worn such that it is not useable. Therefore, a spare check valve 159 (FIG. 4) can be provided on the cap 110.

It is evident from FIG. 5A that, when the cap 110 is inverted, a proximal end of the passage 114 communicating with the fuel outlet hose 120 is positioned lower than is a proximal end of the second housing 132. Such positioning ensures a lower pressure within the can at the passage 114 than in the recessed section 146. Consequently, the fuel inside the can will not flow by gravity into the passages 150 when the check valve 152 is dislodged.

Preferably, the cap 110 comprises a suitable conventional plastic material. The first and second housings 130, 132 of the vent assembly 116 can comprise a metal material into which the several bores 134, 144, 136, 150 have been drilled. As mentioned, the umbrella valve 152 comprises an elastomeric material. Other materials are also contemplated.

Figure 6:
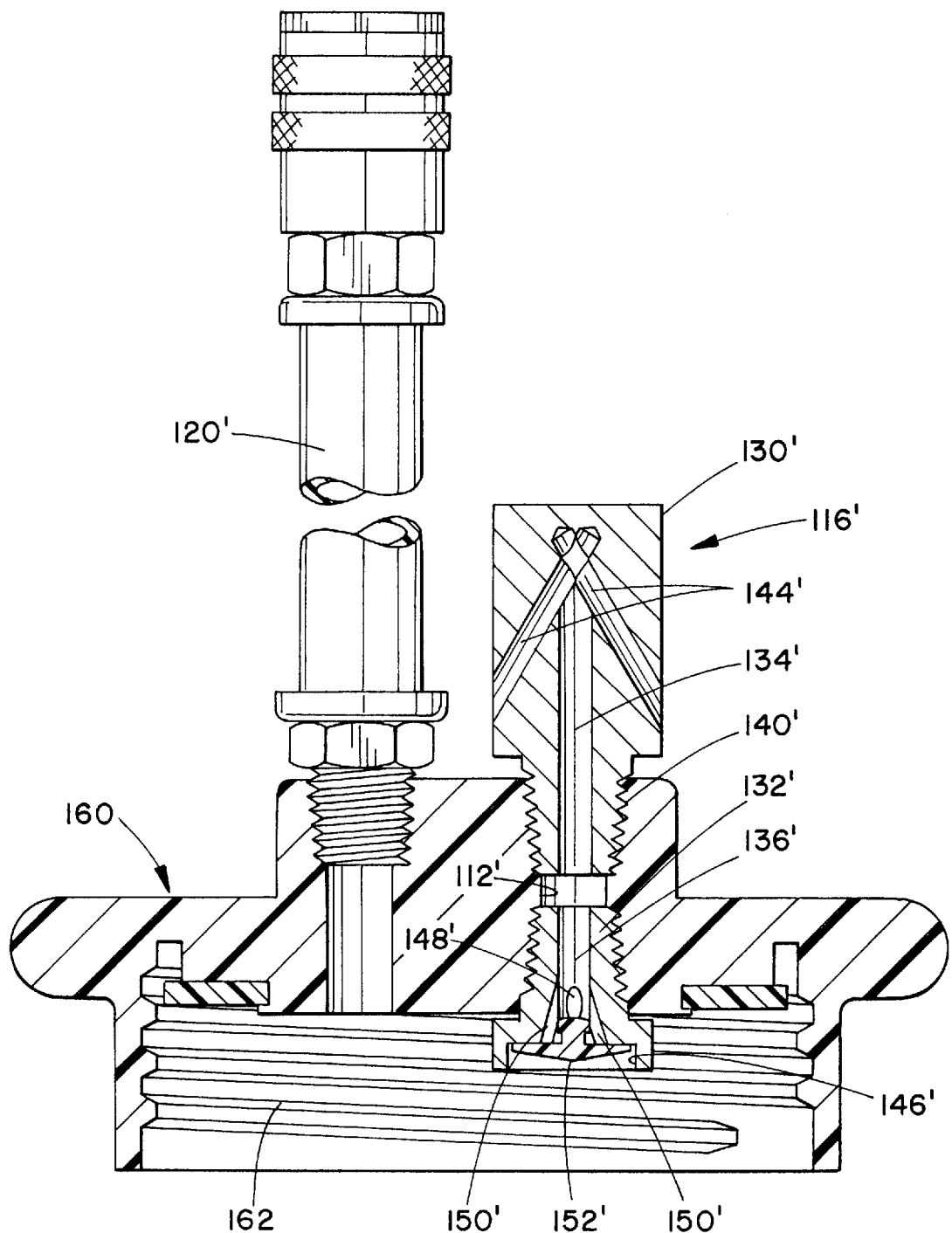
FIG. 6 is a cross-sectional view of a one-piece cap according to a second embodiment of the present invention.

FIG. 6 shows a second embodiment of a cap 160 which is formed from as single piece cap. Like components in this embodiment are designated by like numerals with a primed (') suffix while new components are designated by new numerals. The vent assembly 116' works in a similar manner as has been described above. Threads 162 on the single-piece cap 160 engage the mating threads on the jerrycan. The cap 160 forms an air-tight seal when screwed onto the can.

Figure 7:
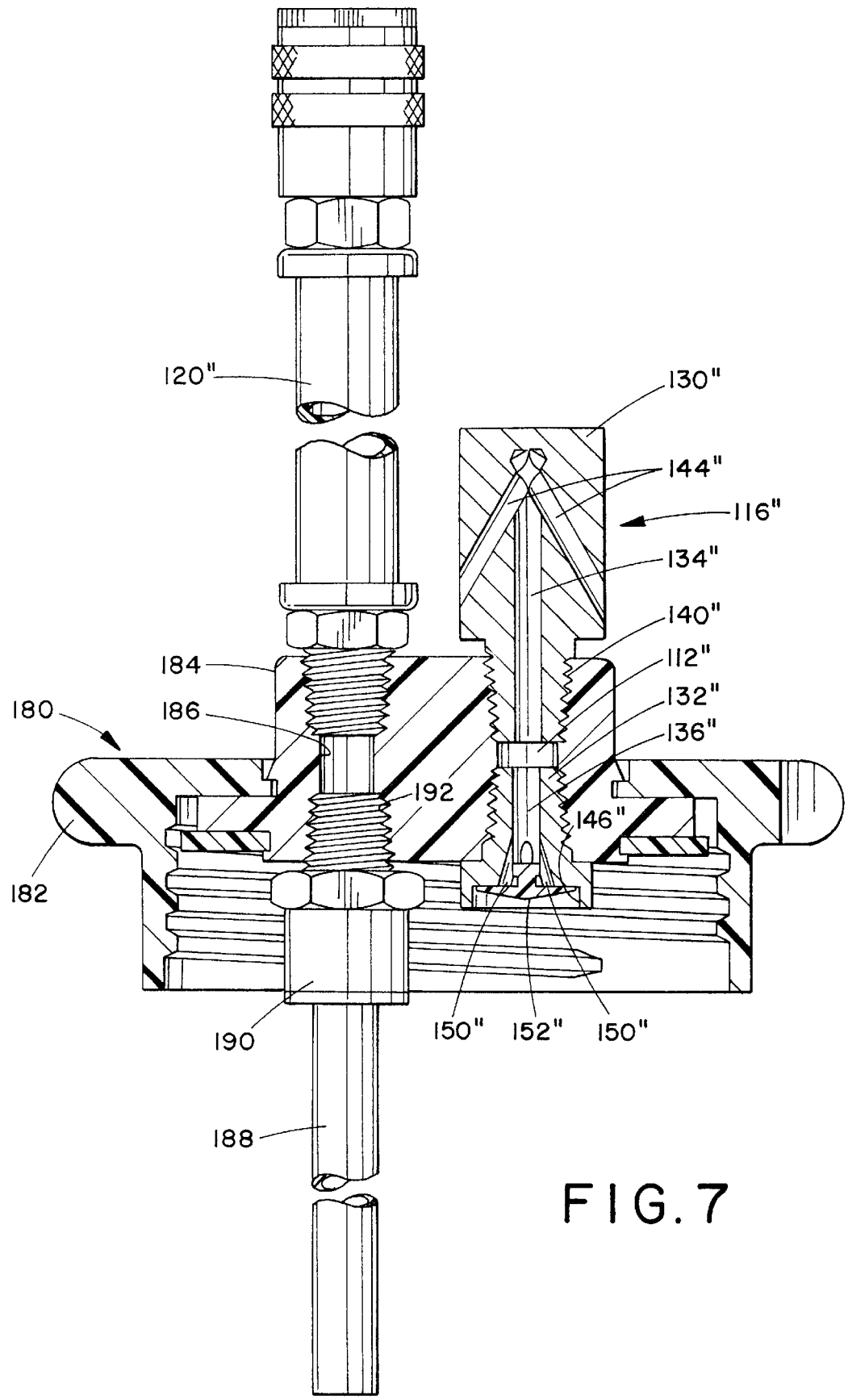
FIG. 7 is a cross-sectional view of a two-piece suction feed cap according to a third embodiment of the present invention.

FIG. 7 illustrates a third embodiment of a cap 180 used when the jerrycan is not inverted. Like components in this embodiment are designated by like numerals with a double primed (") suffix and new components are designated by new numerals. In this embodiment, a suction pump, rather than gravity, is used to draw the fuel out of the jerrycan. Because the jerrycan is oriented right side up on the ground during use, the fuel does not contact an interior of a cap 180. The cap 180 includes an outer rim 182 which surrounds an insert 184. The insert 184 contains an air passage 112" and a fuel outlet bore 186. A vent assembly 116" is fitted in the vent passage 112". A fuel hose 188 extends from the bore 186 into the fuel contained within the jerrycan. The fuel hose 188 is secured via a fitting 190 to a threaded end 192 of the bore 186.

Figure 8:
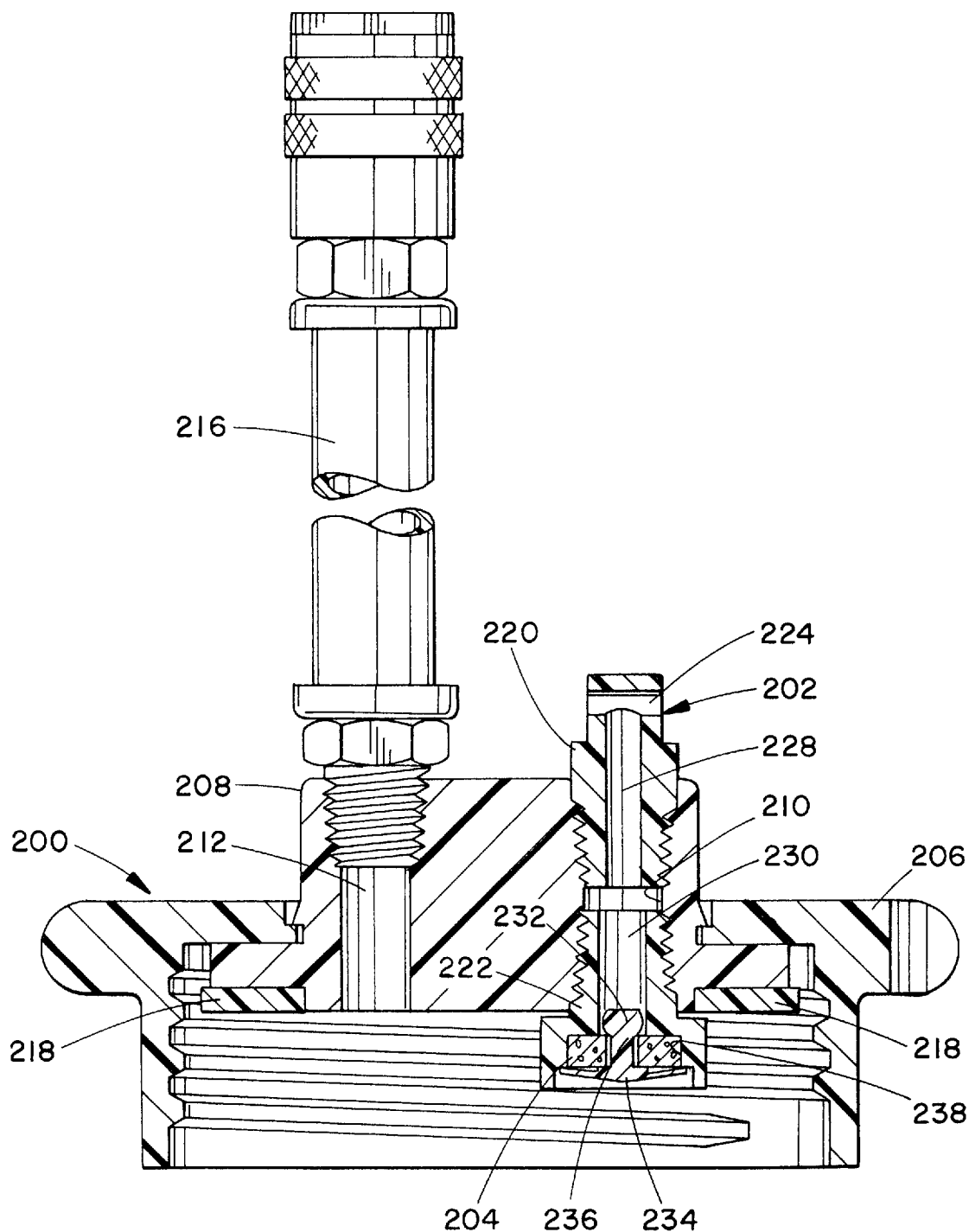
FIG. 8 is a cross-sectional view of a two-piece cap according to a fourth embodiment of the present invention including a sintered metal block in a vent valve assembly.

FIG. 8 illustrates a fourth embodiment of a cap 200 having a vent assembly 202 employing a sintered metal block 204 through which air flows. As in FIG. 5A, the cap 200 is a two-piece assembly which contains a rim 206 and an insert 208. The insert 208 contains passages 210, 212 which communicate, respectively, the vent assembly 202 and the fuel outlet hose 216 with the interior of the can. An air-tight seal between the cap and the can is provided by a conventional seal member 218 which is secured in a groove in the insert. The sintered metal block 204 replaces the side openings and side air passages shown in FIG. 5A. The vent assembly contains a first housing 220 and a second housing 222. The first housing 220 of this embodiment merely contains a single air inlet 224. The air flow path is through a bore 228 in the first housing 220, a bore 230 in the second housing 222, around an enlarged tip 232 of a check valve 234, in an annular path, and through the sintered metal block 204. When the pressure within the jerrycan causes the perimeter of the check valve 232 to be dislodged, air drawn from the atmosphere percolates through the sintered metal block 204 before entering the jerrycan. The valve 234 has a narrowed stem 236 which is accommodated in a central bore 238 of the block 204. The block can be secured, as by adhesive, in a recessed section 240 of the housing 222 and the stem 236 of the valve is pushed into the block bore 238. In this embodiment, the housings 220 and 222 are made of a suitable plastic material.

Figure 9:
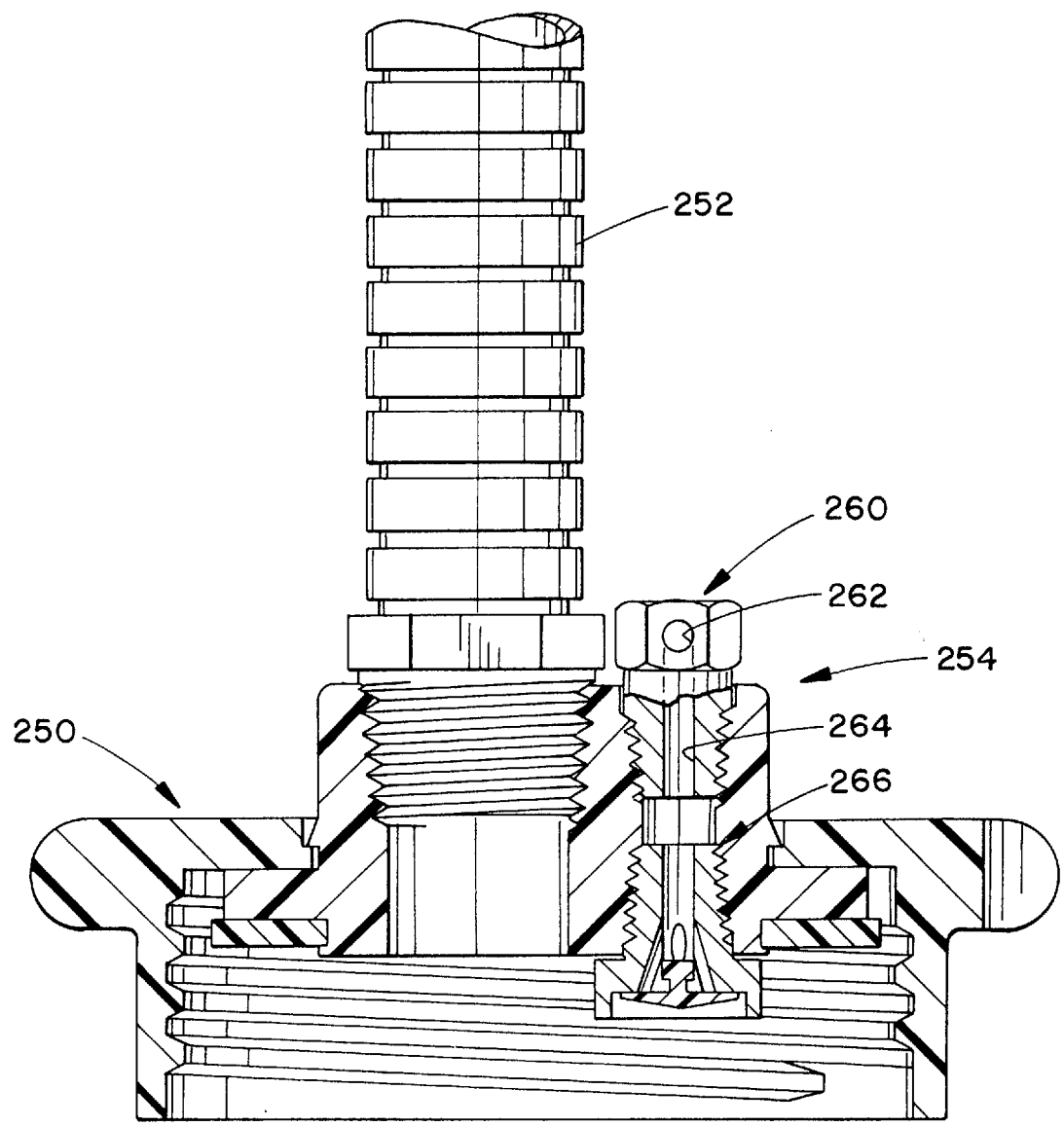
FIG. 9 is a cross-sectional view of a two-piece cap having a pour spout according to a fifth embodiment of the present invention.

FIG. 9 shows a fifth embodiment of a cap 250 having a flexible pour spout 252. Rather than feeding fuel to a heater, the pour spout 252 illustrated in this embodiment may be used to transfer liquid fuel from the jerrycan to a second container. The basic design of the cap 250 and vent assembly 254 shown in FIG. 9 are similar to that shown in FIG. 5B. The pour spout 252 is preferably a flexible metal material. However, other materials are also contemplated. In this embodiment, a first housing 260, made of a suitable metal, is provided with a pair of right angled passages 262 and 264 for allowing air to flow from the environment into a check valve housing 266.

Figure 10A:
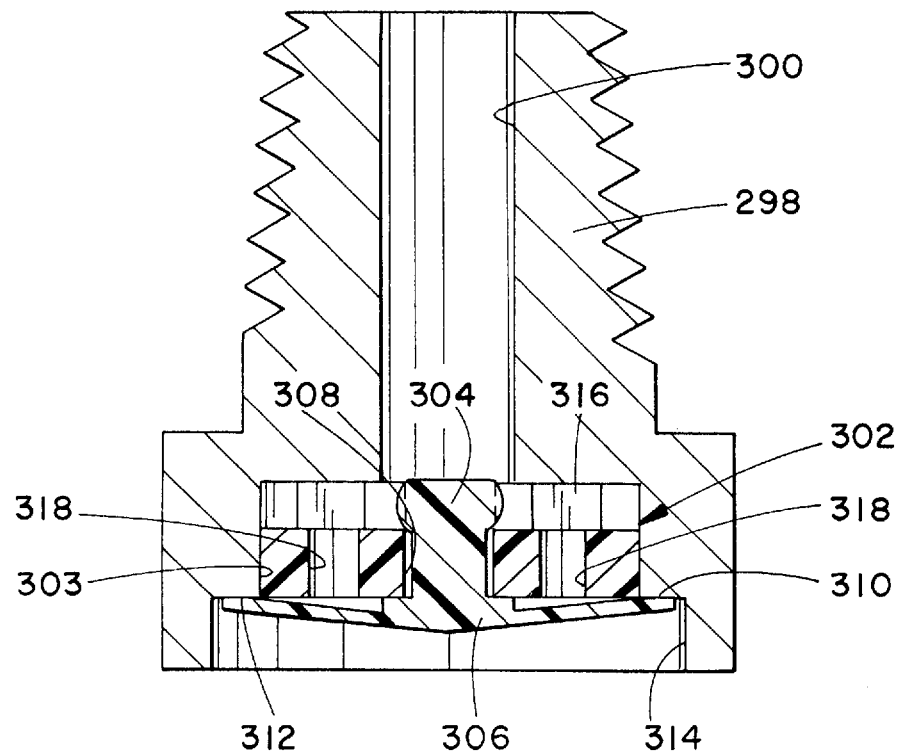
FIG. 10A is an enlarged cross-sectional view of another embodiment of a vent valve assembly according to the present invention; and, FIG. 10B is a perspective view of a plastic vent fitting used in the vent valve assembly of FIG. 10A.
Figure 10B:
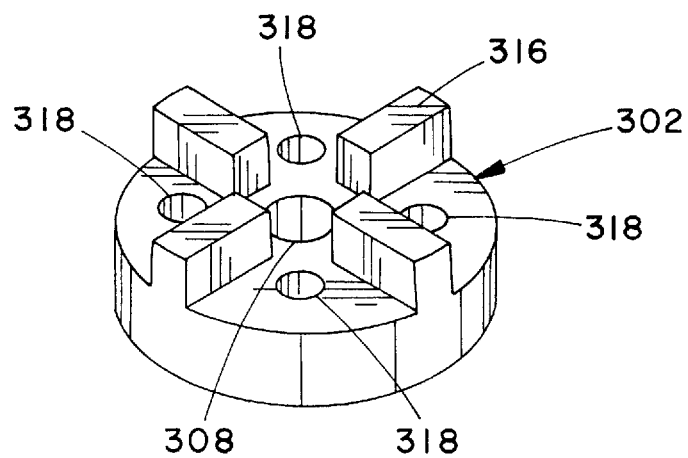

FIG. 10A illustrates an alternate embodiment for a housing for a check valve. In this embodiment, a housing 298 has an air passage 300. In this embodiment, a plastic vent fitting 302 is housed in a first recessed area 303 located at the second end of the air passageway 300. A tip 304 of a check valve 306 seals a central bore 308 of the vent fitting 302. An inner face 310 of the valve 306 then seals against a wall 312 of a second recessed area 314 of the housing 298. In order to allow air to flow through the vent fitting 302, the fitting is provided with a set of spaced ribs 316 between which are located a set of spaced bores 318, as shown in FIG. 10B. The ribs 316 allow air to flow between the fitting 302 and the housing 298. Air thus flows from the air passageway 300 into the recessed area 303, around the ribs 316 and into the bores 318. When the air pressure within the second recessed area 314 decreases, the inner seal face 310 is moved away from the wall 312 and air is allowed to flow into the second recessed area. The vent fitting can be secured in the first recessed area 303 by any suitable means, such as an adhesive or a press fit.

The invention has been described with reference to several preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A tank vent valve assembly, comprising:

a tank;

a cap mounted on the tank;

an outlet passage through the cap;

an inlet passage through the cap, spaced from said outlet passage, the inlet passage having a first end and a second end;

a first housing mounted in the first end of the inlet passage of the cap, the first housing having a first end and a second end;

a first air passage extending through the first housing and having a first end and a second end, the first end of the first air passage communicating with an exterior of the first end of the first housing and the second end of the first air passage communicating with an exterior of the second end of the first housing;

a second housing mounted in the second end of the inlet passage of the cap, the second housing having a first end and a second end and having a recessed area at the second end;

a second air passage extending in the second housing and having a first end and a second end, the first end of the second air passage communicating with an exterior of the first end of the second housing and the second end of the second air passage communicating with an exterior of the second end of the second housing, the first end of the second air passage communicating with the second end of the first air passage; and, an umbrella-shaped check valve mounted in the recessed area of said second housing, the check-valve comprising a centrally located stem and a hood secured to the stem, the hood having a first face and a second face, the first face of the check valve hood sealing against the second end of the second air passage when a pressure on the first face is not greater than a pressure on the second face, and the first face of the check valve hood not sealing against the second end of the second air passage when the pressure on the first face is greater than the pressure on the second face, the check valve being made of an elastomeric material to allow a flexure of a radially outer portion of the hood in relation to a central portion of the hood adjacent the stem.

2. The tank vent valve assembly according to claim 1, wherein the second end of the first air passage communicates with the exterior of the first housing via at least one air vent.

3. A tank vent valve assembly, comprising:

a tank;

a cap mounted on the tank;

an outlet passage through the cap;

an inlet passage through the cap, spaced from the outlet passage, the inlet passage having a first end and a second end;

a first housing mounted in the first end of the inlet passage of the cap, the first housing having a first end and a second end;

a first air passage extending through the first housing and having a first end and a second end, the first end of the first air passage communicating with an exterior of the first end of the first housing and the second end of the first air passage communicating with an exterior of the second end of the first housing;

a second housing mounted in the second end of the inlet passage of the cap, the second housing having a first end and a second end;

a second air passage extending in the second housing and having a first end and a second end, the first end of the second air passage communicating with an exterior of the first end of the second housing and the second end of the second air passage communicating with an exterior of the second end of the second housing, the first end of the second air passage communicating with the second end of the first air passage;

side openings, located near the second end of the second air passage, communicating with the first end of the second housing; and, a check valve mounted in the second housing, comprising an elastomeric material and having a first face and a second face, the check valve first face sealing against the second end of the second air passage when a pressure on the first face is not greater than a pressure on the second face, and the first face not sealing against the second end of the second air passage when the pressure on the first face is greater than the pressure on the second face so that the exterior of the second end of the first housing is in communication with the second end of the second housing via the side openings.

4. The tank vent valve assembly according to claim 1 further comprising a vent fitting accommodated in the recessed area of said second housing, said vent fitting comprising a body, a plurality of ribs protruding from the body and a bore located adjacent each rib.

5. The tank vent valve assembly according to claim 1, wherein the second end of the second air passage comprises a cavity and a block of sintered metal held in the cavity.

6. The tank vent valve assembly according to claim 1, wherein the recessed area of the second end of the second housing includes a vent fitting having a plurality of passages which communicate with the second air passage.

7. A tank vent valve assembly, comprising:

a gravity feed cap contacting a liquid, held in an associated container on which the cap is selectively secured, when the associated container is inverted;

an air inlet passage through the cap, the air inlet passage having a first end and a second end;

a valve housing mounted in the air inlet passage of the cap, the valve housing having a first end and a second end;

an air passage extending through the valve housing and having a first end and a second end, the first end of the valve housing air passage communicating with the first end of the air inlet passage and the second end of the valve housing air passage communicating with an interior of the associated container on which the can is selectively secured; and, an umbrella-shaped check valve mounted in a recessed area of the valve housing air passage and comprising a centrally located stem and a hood secured to the stem, the hood having a first face and a second face, the hood first face sealing against the second end of the valve housing air passage when a pressure on the first face is not greater than a pressure on the second face, the hood first face not sealing against the second end of the valve housing air passage when the pressure on the first face is greater than the pressure on the second face, said check valve being made from a resilient material to allow a flexure of said hood.

8. The tank vent valve assembly according to claim 7, further comprising:
at least one side opening, near the second end of the valve housing air passage, the first end of the air inlet passage communicating with the second end of the valve housing air passage via the at least one side opening.

9. A tank vent valve assembly, comprising:
a cap;
an inlet passage through the cap, the inlet passage having a first end and a second end;
a first housing mounted in the inlet passage of the cap and having a first end and a second end;
a first air passage extending through the first housing and having a first end and a second end, the first end of the first air passage communicating with an exterior of the first end of the first housing and the second end of the first air passage communicating with an exterior of the second end of the first housing;
a second housing mounted in the inlet passage of the cap and having a first end and a second end;
a second air passage extending through the second housing and having a first end and a second end, the first end of the second air passage communicating with an exterior of the first end of the second housing and the second end of the second air passage communicating with an exterior of the second end of the second housing, the second end of the first air passage communicating with the first end of the second air passage;
side openings, located near the second end of the second air passage, communicating with the first end of the second housing; and,
a check valve mounted in the second housing, comprising an elastomeric material and having a first face and a second face, the check valve first face sealing against the second end of the second air passage when a pressure on the first face is not greater than a pressure on the second face, and the first face not sealing against the second end of the second air passage when the pressure on the first face is greater than the pressure on the second face so that the exterior of the second end of the first housing is in communication with the second end of the second housing via the side openings.

10. The tank vent valve assembly according to claim 7, further comprising a block of sintered metal held in a cavity formed in the second end of the valve housing air passage.

11. The tank vent valve assembly according to claim 7, wherein the second end of the air passage of the valve housing includes a vent fitting having a plurality of passages communicating with the air passage, and wherein the check valve seals the vent fitting.

12. The tank vent valve assembly according to claim 7 further comprising a vent fitting accommodated in a recessed area of said valve housing, said vent fitting comprising a body, a plurality of ribs protruding from the body and a bore located adjacent each rib.

13. A cap for a can containing a liquid, comprising:
a cap body having a vent valve assembly passage and an outlet passage;
a vent valve assembly located within the vent valve assembly passage, comprising:
a valve housing mounted to the cap body;
a first air passage, extending in the valve housing, having a first end and a second end, the first end of the first air passage communicating with the vent valve assembly passage and the second end of the first air passage communicating with a first end of each of a plurality of spaced second air passages located in the valve housing, a second end of each of the second air passages communicating with an exterior of the second end of the valve housing; and,
a check valve, mounted in the valve housing, comprising an elastomeric material and having a hood with a first face and a second face and a centrally located stem, the hood first face sealing against the second end of each of the plurality of second air passages when a pressure on the hood first face is not greater than a pressure on the hood second face, and the hood first face not sealing against the second end of each of the second air passages when the pressure on the hood first face is greater than the pressure on the hood second face.

14. The cap according to claim 13 wherein the cap body comprises a first section rotatably mounted in a second section.

15. The cap according to claim 13 wherein the cap body comprises a plurality of spaced indents around an outer periphery of the cap body, the indents being sized to allow the cap body to be manually rotated.

16. The cap according to claim 13 wherein the cap body comprises threads for mating with threads on an associated fuel can.

17. The cap according to claim 13 wherein the valve housing further comprises a peripheral wall which encircles at least a portion of the check valve periphery and extends therepast.

18. The cap according to claim 13 wherein the valve housing further comprises a vent fitting including a plurality of spaced ribs.

19. A cap for a can containing a liquid, the cap comprising:
a cap body contacting the liquid when, during use, the can is inverted;
an outlet passage extending through the cap body;
an inlet passage extending through the cap body;
a first housing mounted in a first end of the inlet passage of the cap body and having a first end and a second end;
a first air passage, extending through the first housing, having a first end and a second end, the first end of the first air passage communicating with an exterior of the first end of the first housing and the second end of the first air passage communicating with an exterior of the second end of the first housing;
a second housing mounted in a second end of the inlet passage of the cap body and having a first end and a second end;
a second air passage extending through the second housing and having a first end and a second end, the first end of the second air passage communicating with an exterior of the first end of the second housing and the second end of the second air passage communicating with an exterior of the second end of the second housing, the second end of the first air passage communicating with the first end of the second air passage;
an umbrella-shaped check valve, mounted in a recessed area of the second housing, comprising a centrally located stem and a hood secured to the stem, the hood having a first face and a second face, the hood first face sealing against the second end of the second air passage when a pressure on the first face is not greater than a pressure on the second face, and the hood first face not sealing against the first end of the air passage when the pressure on the first face is greater than the pressure on the second face, said check valve hood comprising an elastomeric material to allow a movement of said hood in relation to said stem; and, a fuel outlet hose communicating with said outlet passage.

20. The cap according to claim 19 wherein said cap body further comprises a threaded section for mating with threads located on an associated fuel can.

* * * * *